Dec. 24, 1957  A. WITTLIN  2,817,309
LIQUID INDICATOR
Filed Feb. 21, 1956
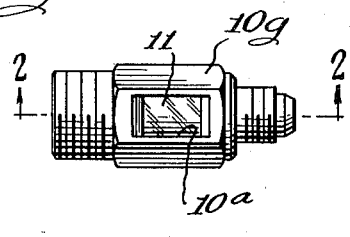
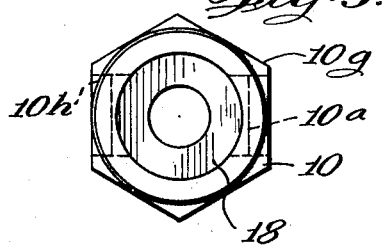
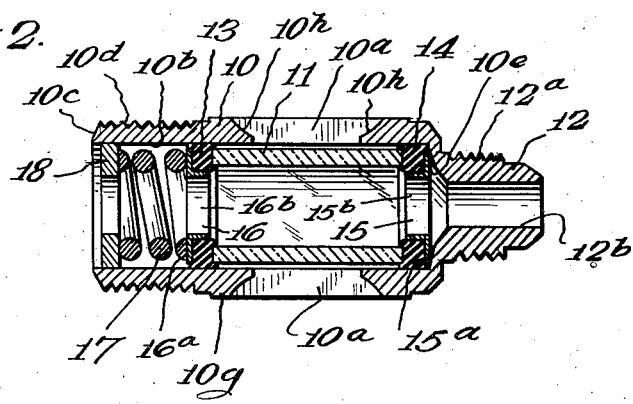
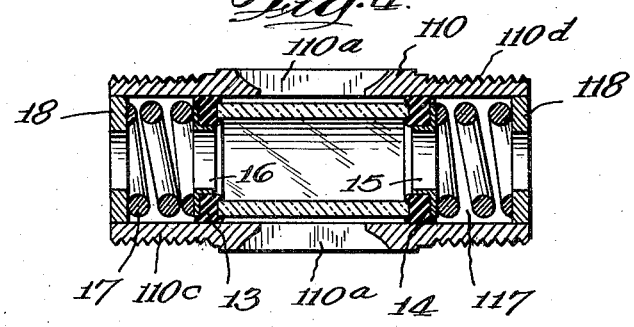
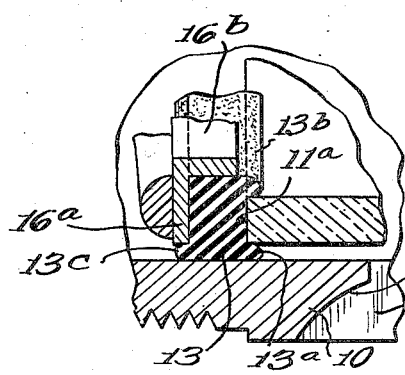
Inventor
Albert Wittlin

United States Patent Office 2,817,309
Patented Dec. 24, 1957

2,817,309

LIQUID INDICATOR

Albert Wittlin, Chicago, Ill.

Application February 21, 1956, Serial No. 566,850

9 Claims. (Cl. 116—117)

This invention relates to a fluid indicator adapted to be inserted in a fluid line for observing the condition of the fluid flowing therethrough.

The indicator of this invention provides a protective member housing, a transparent tube, and sealing means sealing each end portion of the tube to the protective member so that the fluid flowing through the indicator will flow through the transparent tube. The protective member is provided with a viewing port by means of which the fluid flowing through the transparent tube is viewable.

One of the features of this invention is that the fluid indicator is extremely compact and simple in construction so that it occupies only a very small space in the fluid system. This is extremely important when the indicator is used in its preferred environment, which is in the liquid refrigerant line of a refrigeration system, as the indicator of this invention takes up very little space, yet gives a clear, unobstructed view of the fluid in the liquid refrigerant line. Thus, when the indicator is used in a refrigeration system, one end of the indicator can be attached directly if desired to the receiver for the liquid refrigerant without requiring an interposed coupling or piping system. This is true because the protective member itself is so designed as to be constructed like a fitting with the usual threads or other attaching means for attaching it directly to an opening in the receiver.

Another important feature of the invention is that the surrounding protective casing is preferably constructed in the form of a substantially cylindrical tube that is merely cut to the desired size and provided with the viewing port or ports. If desired, one end of this tube may be reduced in diameter so that it can be threaded to constitute a coupling portion. Thus, in this preferred form, the outer protective member of the indicator is of integral construction, merely shaped to the desired contours so that sealing problems involved in joining two or more pieces to make a single protective member are avoided.

Other features and advantages of the invention will be apparent from the following description of certain embodiments thereof taken in conjunction with the accompanying drawings. Of the drawings:

Figure 1 is a side elevational view of one embodiment of the invention;

Figure 2 is a sectional elevational view taken substantially along line 2—2 of Figure 1;

Figure 3 is an end elevational view of the indicator of Figure 1 taken from the left-hand end of Figure 1;

Figure 4 is a view similar to Figure 2, but showing a modification of the indicator;

Figure 5 is an enlarged detailed view in sectional elevation and partially broken away for clarity of illustration of a portion of the transparent tube, protective housing, gasket and associated structure.

The embodiment of the invention shown in Figures 1-3 comprises a protective member or housing 10 containing oppositely located viewing ports 10a and containing a transparent tube 11 preferably made of glass. The transparent tube 11 is aligned with the viewing ports or openings 10a so that the contents of the tube are easily viewed through the openings.

The protective housing 10 in the embodiment shown in Figures 1-3 has one end 12 reduced and provided on its outer surface with threads 12a for attaching in the customary manner to a fluid line. Substantially the remainder of the housing 10 has an internal bore 10b of generally cylindrical shape and of substantially uniform diameter, with this bore extending through the end 10c of the housing 10 that is opposite to the reduced end 12. This end 12c of the housing may be similarly provided with threads 10d for attaching to a fitting or, if desired, for attaching directly to the wall of a refrigerant receiver when the indicator is used in its preferred environment in a refrigeration system.

As can be seen from the drawings, the protective housing 10 is substantially uniform in diameter in its internal bore 10b for almost the entire length of the housing. The reduced end 12 of the housing is provided with its fluid passage bore 12b, which communicates with the interior of the transparent tube 11 and with the internal bore 10b beyond the tube 11 in order to provide fluid flow through the indicator.

The provision of the reduced end 12 of the housing results in a sloped internal shoulder 10e within the housing. However, as can be seen from Figure 2, the entire housing is of integral construction with a uniform, substantially cylindrical, internal bore 10b from the extreme end 10c of the housing to the sloped shoulder 10e.

Means are provided for making a fluid-tight seal between the end portions of the transparent tube 11 and the housing 10. In the embodiment shown, this seal is provided by means of a pair of annular gaskets 13 and 14, with each gasket bearing against an end surface 11a of the transparent tube. The gasket 14 is retained in position against its end of the transparent tube 11 by means of a metal retainer 15. This metal retainer has sides of generally L-shaped cross-section with an annular planar side 15a of this retainer bearing against the side of the gasket opposite to the tube edge 11a and a substantially cylindrical internal flange 15b of the retainer bearing against the inner surface of the gasket 14. This inner flange 15b is substantially concentric with the transparent tube 11 and has an outer diameter slightly less than the internal diameter of the tube 11. The planar portion 15a of the retainer bears against the sloped internal shoulder 10e of the protective housing 10.

At the opposite end of the tube 11 and bearing similarly against the other gasket is a second metal retainer 16. This second metal retainer has a planar portion 16a similar to the planar portion 15a and a flange 16b similar to and substantially aligned with the flange 15b on the opposite retainer.

Bearing against the retainer 16 is a helical compression spring 17 located within the internal bore 10b of the housing 10 between the retainer 16 and the end 10c of the housing. This spring, which is normally substantially coaxial with the housing 10, is held in place and under compression by means of an annular metal retainer 18 fitted within the end 10c of the housing 10. This metal retainer is press fit so as to be retained within the housing 10 and to apply a compressive force on the spring 17. Thus, in actual practice, where the housing 10 and retainer 18 are made of metal such as brass, the retainer 18 has an outer diameter slightly larger than the internal diameter of the end 10c of the housing before the retainer is pressed into place. In one embodiment, this retainer 18 had an external diameter 0.005 inch greater than the internal diameter of the end 10c of the housing 10 before the retainer was pressed into place. Here, the parts were brass and this difference was sufficient to retain the retainer 18 firmly within the housing.

The central portion 10g of the housing 10 surrounding the transparent tube 11 is preferably made of polygonal shape in transverse cross-section. Thus, in the embodiment shown, this portion is hexagonal with all of the sides of the hexagon being equal. This polygonal cross-sectional shape is preferably provided so as to accommodate a wrench by means of which the indicator may be held, turned, or otherwise manipulated during the installation of the indicator.

The oppositely located ports or viewing openings 10a are each preferably located substantially completely within one side of the central portion 10g of the housing. Thus, as is shown in the drawings, each viewing opening 10a is located substantially entirely between two adjacent angles of the polygon. This structure is used so that the cutting away of the indicator to provide the viewing openings or windows will not change the shape of the polygon and so that a wrench may still grasp firmly the portion 10g of the indicator. Thus, if desired, the jaws of the wrench may actually span the openings 10a and permit full force and leverage to be exerted on the indicator.

In the construction as illustrated, the windows 10a have the end surfaces 10h sloped generally inwardly toward each other. This construction produces a shadow box effect so that not only does the viewing opening appear to be larger than it actually is but it also directs the line of sight of the person looking through the opening toward the transparent tube 11 and toward the opposite viewing opening on the other side of the indicator. In addition, this sloped construction strengthens the housing in the areas adjacent the ends of the windows as it is not necessary to remove as much metal at these ends as would ordinarily be required if the sloped construction was not used.

In the embodiment shown in Figures 1-3 inclusive, a single spring 17 applies compressive force on both gaskets 13 and 14 to provide the sealing pressure. Thus, the spring acts directly on the first gasket 13 through the retainer 16 while the spring acts on the second gasket 14 through the transparent tube 11. Although only one spring is used, the entire spring pressure is applied substantially equally to both gaskets 13 and 14.

The gaskets 13 and 14 not only provide sealing pressure against the ends of the transparent tube 11, but also resiliently lock the transparent tube 11 in place spaced from the internal surface of the housing 10. Each gasket also spaces its corresponding retaining member 15 and 16 away from the internal surface of the housing 10. The manner in which this is accomplished is shown most clearly in the enlarged detailed sectional view of Figure 5. Thus, as is shown here, spring pressure on a representative gasket 13 causes one portion 13a of the gasket to be extruded a short distance between the outer surface of the transparent tube 11 and the inner surface of the housing 10. A second portion 13b of the gasket is similarly extruded a short distance between the inner surface of the transparent tube 11 and the outer surface of the flange 16b of the retainer 16. A third portion 13c of the gasket is partially extruded between the outer edge of the retainer portion 16a and the inner surface of the housing 10. Thus, the two gasket portions 13a and 13b lock the transparent tube firmly in position. Similarly, the third extruded portion 13c of the gasket locks the retainer 16 firmly yet yieldingly in position. The opposite gasket 14 functions similarly with respect to the transparent tube and its retainer 15.

In the embodiment shown in Figure 4, the protective housing 110 is provided with opposite openings 110a and a threaded end part 110c similar to corresponding parts of the first embodiment. In the second embodiment, however, the housing 110 is of substantially uniform internal diameter from end to end so as to have a substantially uniform bore. Also, in this embodiment a second spring 117 is provided that is similar to the first spring 17, and this second spring is held in position by an annular retainer 118 similar to the retainer 18. In this second embodiment, the gaskets 13 and 14 and the retainers 15 and 16 are substantially the same in construction and function as are the same parts in the first embodiment. In this second embodiment, both ends of the housing which are of substantially uniform shape and diameter are provided with threads 110d that are similar to the threads 10d of the embodiment of Figures 1-3.

As was pointed out above, the indicator of this invention has a number of advantages not found in prior indicators. Thus, the new indicator is quite compact and requires a smaller number of fittings to attach it into the fluid line. Also, the indicator is much less expensive to make as the shape and configuration of the various parts are kept quite simple. One principal feature of the invention is providing the press fit retainer at one or both ends as exemplified by the retainer 18 in order to hold the parts assembled. This is not only advantageous from an expense standpoint but also makes assembling very easy. Thus, in the embodiment shown in Figures 1-3, it is only necessary in assembling to position in the housing 10 in the order named the retainer 15, gasket 14, the transparent tube 11, gasket 13, retainer 16, and spring 17 and then press into position the press fit retaining washer 18. When this procedure is followed, the parts more or less automatically assume the proper relationship as shown most clearly in Figure 2. In the embodiment shown in Figure 4, substantially the same procedure may be followed except here one of the retainers 18 or 118 may be first pressed in position and the other elements inserted in the proper order in the manner described in connection with the first embodiment.

One important feature of this invention is that neither of the gaskets 13 or 14 seals against shoulders or other inwardly projecting surfaces. Instead, both gaskets seal primarily against the cylindrical portion of the inner surface 10b of the housing 10. Thus, there is no possibility of either gasket shifting away from the sealing surface due to yielding of the gasket material or due to differences of coefficients of thermal expansion of the parts of the indicator as the sealing surfaces may be actually the full internal surface of the housing, not including, of course, the reduced end 12 of the first embodiment.

Although the press fitted end retainers 18 or 118 will retain their position indefinitely, it is actually only necessary that they retain their position long enough for the indicator to be fitted into the fluid line.

Having described my invention as related to the embodiments shown in the accompanying drawings, it is my intention that the invention be not limited by any of the details of description, unless otherwise specified, but rather be construed broadly within its spirit and scope as set out in the accompanying claims.

I claim:

1. An indicator conduit apparatus, comprising: a transparent tube; a surrounding protective member within which the tube is located containing a port through which the tube and contents are viewable; a sealing gasket at each end of the tube making sealing contact with said end and with the adjacent inner surface of the protective member; a pressure applying member within the protective member urging the gaskets into said sealing contact with the tube, the protective member having an internal area of substantially uniform diameter extending from one end thereof and including those portions of the interior occupied by the assembly of transparent tube, sealing gaskets and pressure applying member, the transparent tube, sealing gaskets and pressure applying member being insertable into the protective member through said one end in assembling the indicator; and a separate retaining member located at said one end for retaining said assembly in place.

2. The apparatus of claim 1 wherein the retaining member comprises a closure member retained within said opening and having a fluid passage therethrough.

3. The apparatus of claim 1 wherein said pressure applying member comprises yieldable resilient means.

4. The apparatus of claim 1 wherein said retaining member comprises an annular washer press fitted within said one end.

5. The apparatus of claim 1 wherein each gasket is located at an end edge of the tube and each gasket includes a first portion extruded into the area between the tube and protective member and a second portion extruded around an inner edge of the tube, to lock the tube firmly yet yieldingly in place and maintain the tube out of contact with the protective member.

6. An indicator conduit apparatus, comprising: a transparent tube; a surrounding protective member within which the tube is located containing a port through which the tube and contents are viewable; a sealing gasket at each end edge of the tube making sealing contact with said edge and with the adjacent inner surface of the protective member; resilient means within the protective member urging the gaskets into said sealing contact with the tube, the protective member having an internal area of substantially uniform diameter extending from one end thereof and including those portions of the interior occupied by the assembly of transparent tube, sealing gaskets and pressure applying member, the transparent tube, sealing gaskets and pressure applying member being insertable into the protective member through said one end in assembling the indicator; and a closure member press fitted within said one end having a fluid opening therethrough, for retaining said assembly in place.

7. An indicator conduit apparatus, comprising: a transparent tube; a surrounding protective member within which the tube is located containing a port through which the tube and contents are viewable; a sealing gasket at each end of the tube making sealing contact with said end and with the adjacent inner surface of the protective member; a pressure applying member within the protective member adjacent to one end thereof urging the gaskets into said sealing contact with the tube; and a closure member press fitted within said one end having a fluid opening therethrough, for retaining said assembly in place.

8. An indicator conduit apparatus, comprising: a transparent tube; a surrounding protective member within which the tube is located containing a port through which the tube and contents are viewable; a sealing gasket at each end of the tube making sealing contact with said end and with the adjacent inner surface of the protective member; a pressure applying member within the protective member urging the gaskets into said sealing contact with the tube, the protective member being a continuous metal tube of substantially uniform internal diameter throughout the length thereof that includes one end of the protective member and the space occupied by the transparent tube, a sealing gasket and a pressure applying member; and a separate retaining member located at said one end for retaining said assembly in place.

9. The apparatus of claim 8 wherein said retaining member comprises an annular washer press fitted within said one end.

References Cited in the file of this patent

UNITED STATES PATENTS

| | | |
|---|---|---|
| 2,136,261 | Anderson | Nov. 8, 1938 |
| 2,570,322 | Christopher | Oct. 9, 1951 |
| 2,725,844 | Wittlin | Dec. 6, 1955 |
| 2,744,487 | Moore | May 8, 1956 |